June 12, 1956 — E. S. ROBERTS ET AL — 2,750,266

CATALYTIC REACTOR FOR HYDROCYANIC ACID PRODUCTION

Filed June 25, 1954 — 2 Sheets-Sheet 1

Fig. I.

INVENTORS.
Oscar F. Wiedeman
Edward S. Roberts
Samuel Strelzoff

BY *Harry H. Kline*
ATTORNEY

INVENTORS.
Oscar F. Wiedeman
Edward S. Roberts
Samuel Strelzoff

United States Patent Office 2,750,266
Patented June 12, 1956

2,750,266

CATALYTIC REACTOR FOR HYDROCYANIC ACID PRODUCTION

Edward S. Roberts, New York, N. Y., Oscar F. Wiedeman, New Orleans, La., and Samuel Strelzoff, New York, N. Y., assignors to Chemical Construction Corporation, New York, N. Y., a corporation of Delaware Application June 25, 1954, Serial No. 439,192

2 Claims. (Cl. 23—288)

This invention relates to an improvement in apparatus for performing catalytic oxidation and more particularly to an improved combustion chamber for this purpose. Still more specifically the invention relates to an improved combustion chamber, particularly well adapted for use in producing hydrocyanic acid.

The production of hydrocyanic acid for industrial use has been accomplished in many different ways. Some of these, for example, the acid treatment of cyanides, have been commercially developed to produce large annular tonnages. Because of the importance of the product, frequent proposals have been advanced for processes using novel or more readily-available raw materials. These usually represent attempts to lower production costs. However, for various reasons, none of these newer proposals have proved to be entirely successful.

One of the more promising appearing of such proposals was to react a gas mixture comprising ammonia, a gaseous or vaporized hydrocarbon, and the requisite amount of oxygen or air. The mixture, at or below atmospheric pressure, was subjected to combustion in the presence of a suitable catalyst, preferably a metallic platinum-iridium alloy, although other noble metals and alloys were suggested. The hydrocyanic acid content of the combustion products was then separated therefrom.

Theoretically, the operation of such a process appears to offer many commercial advantages. Readily-available starting materials are utilized and the reaction would appear to be capable of being readily conducted in a simple apparatus. In attempted practice, however, appearances proved to be deceptive. Many difficulties, largely unexpected, developed. As a result, the process was considered impractical for commercial development.

The present invention is directed to an improvement over one such apparatus described in the U. S. Patent 2,584,080, to Houpt which is incorporated herein by reference. We have found that the reactor described and claimed in that patent is not readily capable of producing hydrocyanic acid in large annual tonnages. This is because the capacity of the reactor is greatly limited by the required presence of the specially designed and fabricated catalyst structure described in the patent, supra. Essentially, that catalyst structure involves the combination of a multi-layered pyramidal or conical section of a catalytic metal gauze and a unitarily attached mounting ring or support of sheet material. That mechanical arrangement substantially limits the reactor capacity because the diameter of the catalyst rim must be small, for otherwise the stresses on the catalyst would tear it from the rim support. This phenomenon is caused by two major stresses on the rim which supports the catalyst gauze. These stresses may be described as (a) a resultant stress, that is, the weight of the gauze hanging downwardly and (b) the stress due to the impingement of a gas stream on the gauze itself. The combined stresses, (a) and (b) above, increase as the square of the diameter of the pyramidal or conical catalyst, whereas the strength of the rim or of the supporting edge of the gauze is a linear or first order function of the diameter. Therefore, there is a finite size at which the sum of the stresses exceeds the strength of the gauze, particularly at its attachment edge to the rim, where the most stress is concentrated. Experiment has since shown that this finite size for a platinum alloy mesh cone is within a diameter range of from 1 to 3 feet. The maximum feasible diameter, within this range spread, is dependent upon the angle of the cone, temperature of operation, gas velocity and the strength of platinum alloy used. If a conical catalyst gauze of three or more feet in diameter is attempted in practice, it tears or separates from the supporting rim within a relatively short period of operation and the oxidation reaction of gaseous hydrocarbon, ammonia and air cannot thereafter occur on the catalyst gauze. Accordingly, a reactor of the type described in the U. S. Patent 2,584,080 to Houpt cannot be used successfully for large tonnage operation, since the diameter of the reactor is limited.

It has been further found that for large daily tonnage production of hydrocyanic acid of the order of 20 tons, the internal diameter of the reactor must be at least 5 feet. The conical gauze described above does not lend itself to any practical means of support for a catalyst in a reactor greater than 3 feet in diameter. As stated in U. S. Patent 2,552,279 to Houpt, it is highly desirable to employ a flat catalyst gauze. However, a large flat gauze requires a supporting structure, for otherwise it would, in a very short time, be torn from the edges, where it is attached to the reactor wall, by stresses similar to, but even greater than, those which render large conical gauzes impractical as described above. However, prior to this invention, no combination of materials was known which provided a practical catalyst support to prevent buckling and tearing of the gauze in hydrocyanic acid manufacture and the like.

There exists an urgent need in the art for a reactor which includes a flat catalyst gauze that does not limit the capacity of the reactor. Preferably, the reactor should be capable of making large daily tonnages of hydrocyanic acid to fulfill the demands of industry.

It is therefore an object of the present invention to develop a type of reaction chamber suitable for use in carrying out this and similar processes. Preferably, such an apparatus should be capable of obtaining substantially uniform conditions before and during reaction, without being unduly complicated in structure and operation. Presumably, too, it should be capable of operation at superatmospheric pressures.

The object of the invention has been accomplished by developing a novel reactor combining in a simple apparatus a number of new and novel features. The apparatus of the present invention will be more completely described with reference to the accompanying drawing in which.

Figure 1:
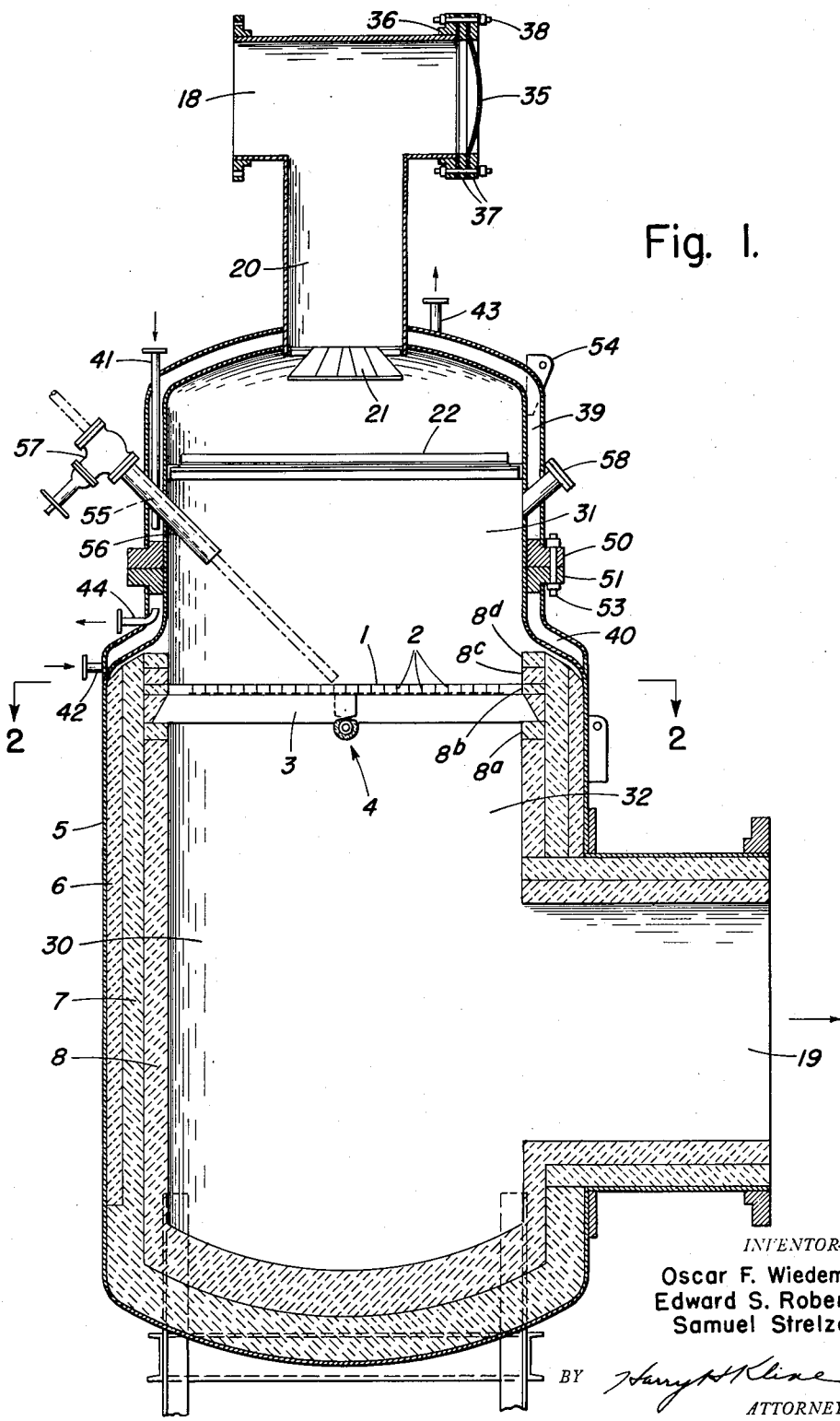
Figure 1 is a vertical section of the apparatus of the present invention showing the catalyst and catalyst supporting structure therein.

A catalyst structure, particularly well suited for carrying out the reaction of air, ammonia, and a gaseous hydrocarbon to obtain hydrocyanic acid is described in our copending application, Serial Number 439,193, filed of even date. This structure comprises multiple layers of flat catalyst gauze, which is well known in the art and is generally made from platinum-iridium alloy, and a mounting therefor. The mounting structure comprises a plurality of parallel nickel-chromium-iron alloy strips, such as "Inconel" strips, and Carborundum bars wherein the strips repose on the Carborundum bars. In order to add further rigidity to the Carborundum bars, these may be further supported by a hollow internally water cooled inconel or steel beam which may be covered with a ceramic material such as silica and the like. The catalyst and mounting structure therefor will be more particularly discussed with reference to Figure 2 of the drawing.

In the present invention as shown in the accompanying drawings, the general design of the reactor, designated generally as 30 in Figure 1 is intended to enclose a gas chamber 31 and a combustion chamber 32 of sufficient size to permit completion of oxidation to the desired degree in large daily tonnages, i. e. five feet or more in diameter. The two chambers are separated by a catalyst gauze 1. They are formed by building up a number of structural elements. An elongated outer casing 5 of suitable material, preferably aluminum, titanium or stainless steel, is used to combine the whole structure within an integral sealing wall. This outer casing may be a single structural element. It can be a single suitable casing, but generally is made as shown by welding together a number of separately made parts. If desirable, it may be united by riveting or by suitable flanges and bolts. The effectiveness of the casing for holding the reactor together as a unit is not particularly concerned with how the casing itself is formed. In Figure 1, the reactor is made up in two sections. They are joined by a pair of flanges 50 and 51 and bolts 53. The upper section can be removed easily by lug 54 for servicing the reactor.

Casing 5 does involve a number of features which are present regardless of the specific shape and casing per se. At the top, as shown in Figure 1, there will be provision for attaching a suitable cover for containing an explosion disc 35 and mounted thereon by any suitable means such as flange 36, rings 37 and bolts 38. The upper part of the casing will include hollow jackets shown at 39 and 40 for the circulation therein of heating or cooling fluid introduced through conduits 41 and 42 and discharged through conduits 43 and 44. Similarly, the bottom of the casing may include a hollow section (not shown) for the circulation of fluid introduced where the casing material is aluminum. However, since stainless steel lined with refractory material may be used, provision for cooling the bottom of the casing as by water-cooling is not necessary and may be omitted without any detrimental effect.

Gases are introduced into the casing through the open mouth 18 and are discharged at the bottom through an open port 19 at the bottom end. As the gases proceed downwardly, through the neck of the reactor 20, they are baffled by a conventional baffle 21 at the apex of said neck 20. The gases are then led through a distributor plate 22, which may be made of any suitable wire mesh material, for purposes of obtaining a stream line flow of gases.

Installation of the reactor lining is accomplished by introducing suitably formed shapes through the top of the casing 5 as shown in Fig. 1. The lining is built up of a plurality of sections of refractory materials, said sections in turn being used to form a plurality of layers. The outer layers, for simplicity, represented by layers 6, 7 and 8, although a larger number are ordinarily used, are made up of some refractory material such as insulating fire brick or the like. The insulating bricks, or their equivalents, which go to make up these outer layers are so chosen of progressively different thermal conductivity characteristics as to maintain the proper thermal gradient between the walls of chamber 32 and casing 5 to protect the latter from becoming overheated. Within these insulating layers is the actual lining of combustion chamber 32. This inner lining is of some hard, smooth, higher temperature refractory, such as mullite or the like, having as low an iron content as possible, designated as 8. As shown in Figure 1, the inner chamber is formed by a number of vertically superimposed annuli 8a, 8b, 8c, and 8d. The lining is composed of separate segmented annuli for a number of reasons including simplicity of fabrication, ease of replacement, and convenience in installation. The number of annular rings and the exact shapes of any particular rings or segments thereof may be widely varied, depending on the overall size of the apparatus. While most of the annuli covering the inner refractory lining could be made up as unitary rings, such rings would crack in service. Further, for purposes of this invention, it is wholly necessary to provide for vertically superimposed annuli, particularly within the region of the catalyst gauze and the mounting structure therefor, comprising nickel-chromium-iron alloy strips 2, Carborundum bar 3, and a hollow, silica covered beam 4. This arrangement is advantageous, since these superimposed annuli are employed for purposes of maintaining the edge of the catalyst and the supporting structure in a rigid condition during operation.

Figure 2:
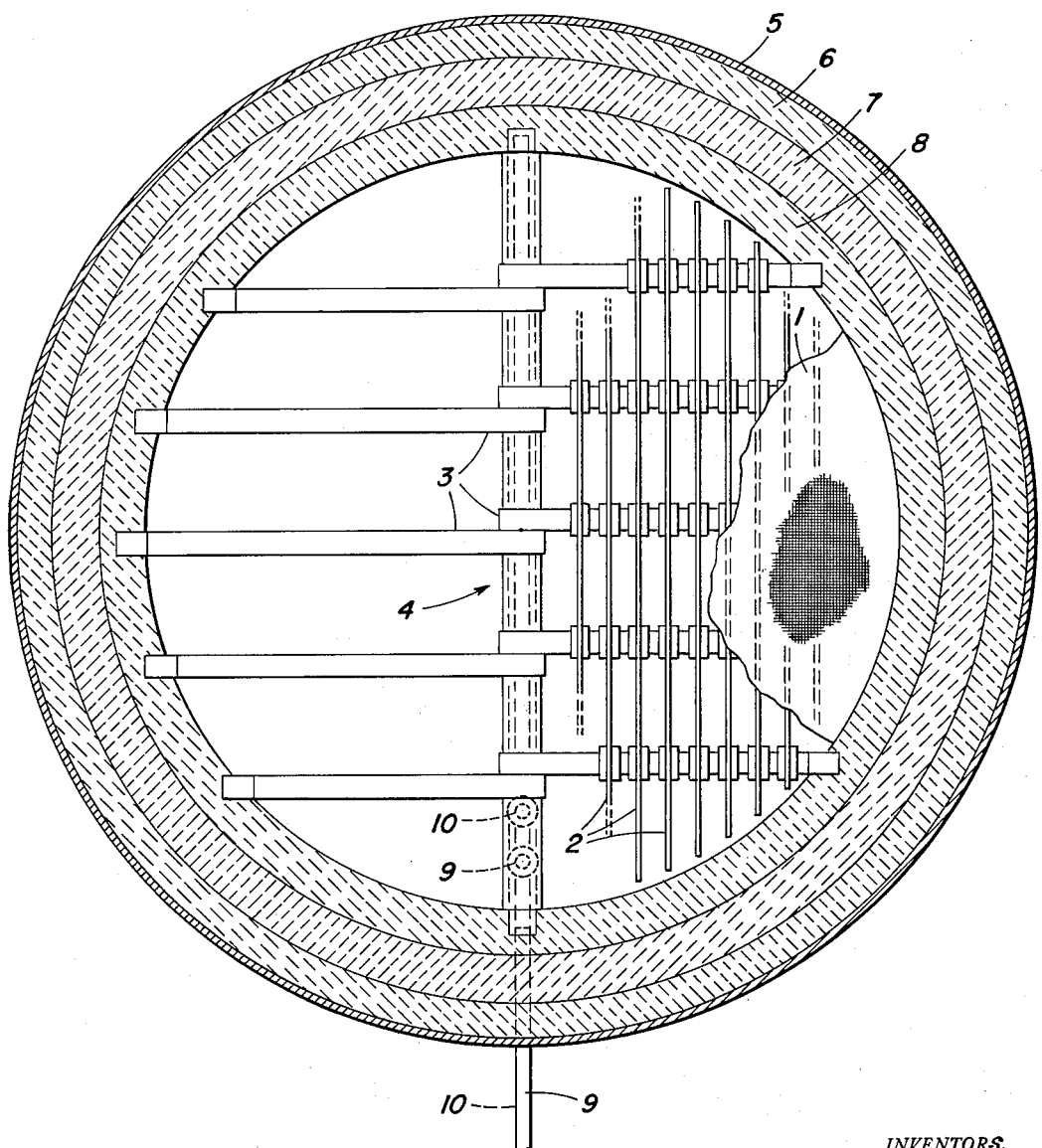
Figure 2 is a plan view, partly in section, of the catalyst and mounting structure support taken along line 2—2 of Figure 1.

As shown in Fig. 2 which is an elevation, partly in section taken along line 2—2 of Fig. 1, the catalyst gauze 1 is supported at the rim by mounting the gauze into the face of the high temperature refractory 8 at the circumference. This gauze is further supported by a grid or plurality of parallel nickel-chromium-iron alloy strips 2, which strips are in turn supported by more rigid structures 3 made from Carborundum. These are usually in the shape of bars. In order to insure complete rigidity of the nickel alloy strips and Carborundum, the Carborundum bars are supported in turn by a hollow, silica jacketed, internally water cooled beam 4. Provision is made for silica jacketed pipe 9 which extends through the casing into the reaction so as to permit the introduction of water or other cooling medium into the beam and for the exiting of the liquid at 10. As shown in Fig. 2, the Carborundum bars are circumferenially inserted into the mullite or refractory lining of the vessel. The alloy strips 2 must be free to move, with thermal expansion, at their ends and are therefor not supported rigidly by the mullite wall. This technique permits expansion of nickel-chromium-iron alloy strips due to the fact that the alloy will expand somewhat longitudinally when heated to the required reaction temperature.

Provision is also made for igniting the gauze by means of an igniter as shown in Fig. 1. This igniter, 55, provides for a casing 56 and two tubes (not shown) permitting the gas to flow therethrough. One tube is designed for the introduction of air or oxygen and the other for the introduction of hydrogen. The igniter is also provided at its tip or inner end with a spark plug and an insulated wire connection (not shown) to the insulated terminal of the spark plug. After suitable flows of oxygen and hydrogen have been introduced through the tubes, approximately 10,000 to 15,000 volts of electricity are supplied to the spark plug to induce a spark across its terminals. As the flow of oxygen and hydrogen is ignited by this spark, a flame results, and a spot on the catalytic gauze is immediately heated, thus initiating the desired reaction of the reactor feed gases on the catalyst. After this has occurred, the entire igniting unit is withdrawn, and the pressure of the system is maintained by closing a valve 57 in the port through which the igniter tube had been inserted. Provision is also made to observe the entire reaction through a sight glass 58.

While the apparatus has been discussed particularly with relation to the accompanying drawings, other designs may be employed. For example, the gas outlet may be located directly at the very bottom rather than the side of the reactor.

The apparatus of my invention thus provides for large daily tonnages of HCN. It further provides for reactors which are not limited as to the size of the catalyst and the mounting structure therefor. It further provides for a catalyst which does not fail during the production of HCN because it is amply supported by materials which do not affect the reaction involved in the making of HCN.

The baffle and distributor plates are essential in the apparatus of my invention, since without them one could not obtain a uniform stream line flow of the gases to the catalyst gauze and the outer rim would be cooler by a degree sufficient to cause the catalyst structure to fail in this cooler zone. By this means equal temperatures in all parts of the catalyst are easily maintained without the necessity of supplying additional heat either to the catalyst gauze or to the support thereof.

We claim:

1. A catalytic reactor adapted for the production of hydrocyanic acid having in combination: a vertically-positioned, elongated, metal casing; a horizontal flat catalyst gauze dividing means whereby the space between the casing is vertically positioned into an upper gas chamber and a lower combustion chamber, said chamber consisting of refractory ceramic segments of suitable arc positioned symmetrically about the vertical axis of said casing; said catalyst gauze being mounted between said refractory ceramic segments at the circumference thereof; a support structure for said catalyst gauze, said structure comprising a plurality of parallel nickel-chromium-iron alloy strips and Carborundum bars of uniform cross-section wherein the catalyst, nickel-chromium-iron alloy strips and Carborundum bars repose on each other respectively, and wherein the Carborundum bars are further supported by a hollow, silica covered beam; means for cooling said beam; a single gas inlet port in said gas chamber, said port having a symmetrically enlarged opening at its uppermost gas chamber and means for cooling the gas chamber; a baffle positioned between the inlet gas port and the horizontal dividing means; a distributor plate positioned between the dividing means and said baffle, adapted to provide for parallel flow of gases; a refractory ceramic lining in said combustion chamber consisting of a plurality of superimposed refractory ceramic annuli; and a gas outlet in the combustion chamber most remote from said gas inlet port.

2. A reactor according to claim 1 characterized in that said casing is stainless steel, said ceramic annuli composed of a smooth, hard, low-iron content ceramic, and that said casing is provided with hollow jackets over the gas chamber portion for the circulation of cooling liquid therethrough.

References Cited in the file of this patent

UNITED STATES PATENTS

| | | |
|---|---|---|
| 1,270,989 | Taliani | July 2, 1918 |
| 1,427,554 | Selden | Aug. 29, 1922 |
| 2,584,080 | Houpt | Jan. 29, 1952 |
| 2,607,663 | Perry et al. | Aug. 19, 1952 |